United States Patent [19]
Jastrab

[11] 4,289,396
[45] Sep. 15, 1981

[54] MICROFICHE READER PRINTER WITH INTERCHANGEABLE CARRIAGES

[75] Inventor: Alexander G. Jastrab, Hartford, Wis.

[73] Assignee: Bell & Howell Company, Chicago, Ill.

[21] Appl. No.: 95,703

[22] Filed: Nov. 19, 1979

[51] Int. Cl.$^3$ .............................................. G03B 13/28
[52] U.S. Cl. .................................. 355/45; 353/27 R; 355/54
[58] Field of Search ....................... 353/27; 355/45, 54

[56] References Cited

U.S. PATENT DOCUMENTS

| 3,865,484 | 2/1975 | Heldenbrand et al. | 355/45 |
| 3,992,089 | 11/1976 | Hirose et al. | 355/45 X |
| 4,220,404 | 9/1980 | Hofmann et al. | 353/27 |

*Primary Examiner*—Richard A. Wintercorn
*Attorney, Agent, or Firm*—Alan B. Samlan; J. Warren Whitesel

[57] ABSTRACT

A microfilm reader/printer has a plurality of interchangeable film carriers to accommodate microfiche of different sizes and format. The film carriers are normally latched into two orthogonally oriented pairs of spaced, parallel rails so that film movement is limited. However, if a film carrier is unlatched from said rails, one of the carriers may be interchanged for another.

8 Claims, 8 Drawing Figures

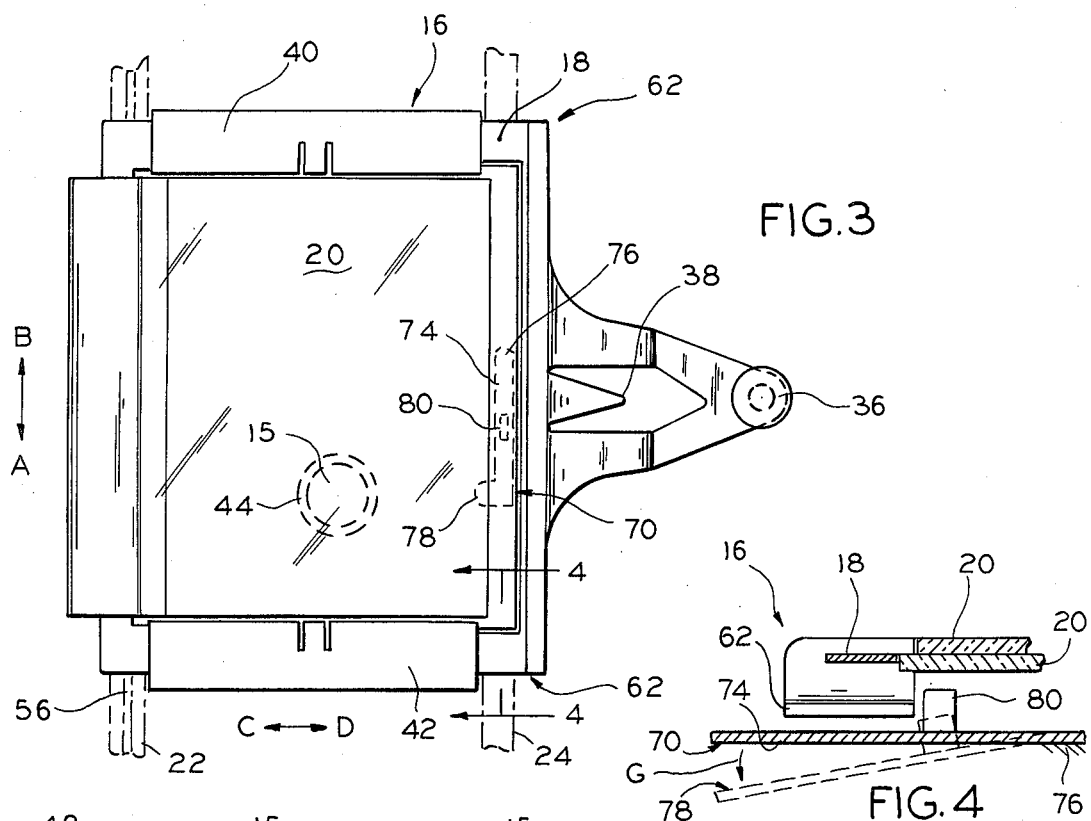
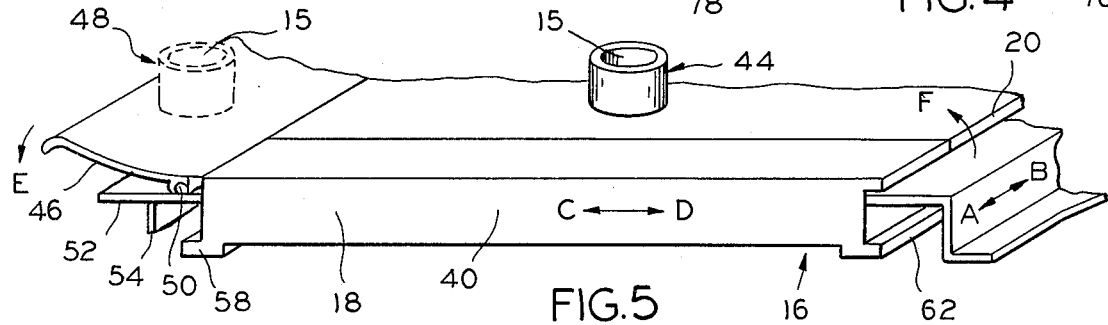
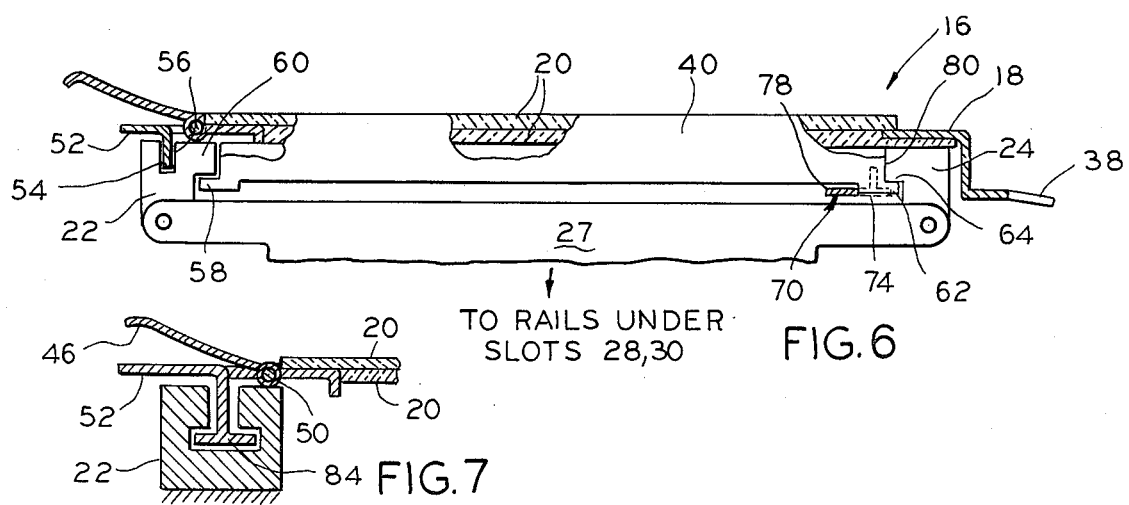
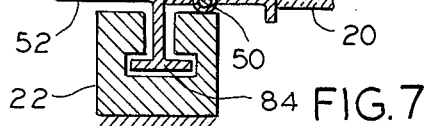

MICROFICHE READER PRINTER WITH INTERCHANGEABLE CARRIAGES

This invention relates to microfilm reader/printers and, more particularly, to reader/printers having interchangeable carriages for enabling a use with a great variety of different sizes and kinds of microfilm, especially in the format known as "microfiche."

Microfilm reader/printers are used to read or print images which may be found on many different forms of film. Some images are relatively large, and some images are relatively small. Exemplary of these types of microfilm are microfiche, which are discrete rectangular cards of film having thereon a plurality of images arranged in an orthogonal array. These cards of film may be provided in any of a number of different standard sizes and magnifications.

Heretofore, reader/printers have generally been designed and manufactured to be used primarily with one style of film. For example, one microfiche may be a card of film which is approximately 4"6×". Another microfiche may be larger (e.g., 7¼"×4") while still another microfiche may be smaller. Some microfiche may have many small images requiring a great degree of magnification while others may have fewer and larger images requiring a lesser degree of magnification.

The content of the microfiche may also have a bearing upon the design of a reader/printer. For example, if a substantial number of pages must be examined, with a lot of cross-checking, as during a single research project, it may be well to provide a reader/printer which is capable of moving back and forth between a very large number of microfiche images. Otherwise, it will be necessary to waste substantial amounts of time repeatedly loading and unloading the reader/printer.

Thus, there is a need for a reader/printer having substantial flexibility which enables a quick and easy selection of interchangeable carriers for receiving and supporting different shapes, sizes and numbers of microfilm and especially microfiche.

Accordingly, an object of the invention is to provide new and improved microfilm reader/printers. In particular, an object is to provide such reader/printers for microfiche. In this connection, an object is to provide reader/printers having a plurality of interchangeable carriers.

Another object of the invention is to provide microfiche reader/printers having carriers for enabling a viewer to switch back and forth between either of two microfiche without requiring a reloading of the carrier.

In keeping with an aspect of the invention, a microfiche reader/printer has a platform carrying a pair of spaced, parallel rails. The rails include means for slidably receiving a microfiche carrier supported for orthogonal movement, so that it may glide back and forth, between limits which enable a display of any selected image. A spring catch is designed to capture the carrier while it is in a reading position and thereby prevent its inadvertent removal from the rails. On the other hand, an operation of the catch enables the carrier to be removed and replaced, quickly and easily.

Preferred embodiments of the invention are shown in the attached drawings, wherein:

FIG. 3 is a plan view of an exemplary microfiche carrier supported in a reading position by a spaced, parallel pair of rails on the reader/printer base of FIG. 2;

FIG. 4 is a cross-sectional view of a front corner of the microfiche reader showing the operation of a carrier latch;

FIG. 5 is a fragmentary perspective view of an end of a microfiche carrier;

FIG. 6 is an elevational end view of a microfiche carrier resting on the guide rails of a reader/printer;

FIG. 7 is an alternative design showing a different form of hold-down for the back of the carrier.

Figure 1:
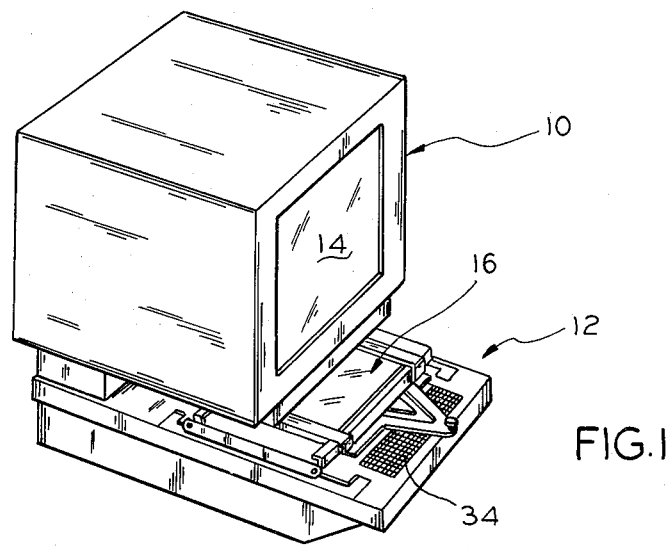
FIG. 1 is a perspective view of an exemplary microfiche reader/printer incorporating the invention.

The microfilm reader/printer of FIG. 1 comprises an upper unit 10 and a base unit 12. The upper unit 10 is an essentially empty box forming an enclosure for an optical path terminating in a viewing screen 14 and containing any suitable reflectors not shown for folding the optical path within the box. The lower or base unit 12 includes a light source having the usual projection bulb, mirror, and condenser lens (none of which are shown). A projection lens 15 (FIG. 5) is provided for focusing upon the screen 14 an image from the film, which is illuminated from the light source inside base unit 12. A microfilm bearing the image is supported between a pair of flat glass plates (called "glass flats") in a film carrier 16 which is interposed between a condenser lens and the projection lens.

Film carrier 16 is a frame 18 having a pair of glass flats 20 for supporting a microfiche in an optical plane. The frame 16 is mounted to glide on a spaced, parallel pair of rails 22,24, with back and forth movements (in directions A,B) between two end positions. The rails 22,24 are, in turn, supported on a second and perpendicular pair of spaced parallel rails concealed beneath a cover plate 26 of the reader/printer base 12. Each end of the film carrier 16 includes a dependent plate 27 which projected through slots 28,30, formed in cover plate 26, to gain access to and ride on this second pair of rails. Thus, the carrier may move between two limits in directions C,D by gliding over the second pair of rails.

It should now be quite apparent that the film carrier 16 may glide along the rails to any point situated between two opposed limits located in each of the two perpendicular directions A,B and C,D. This movement brings any of the orthogonally oriented images on the film supported by said carrier into alignment with an optical path extending through a window 32 on the top of the base unit 12. Obviously, the projection lens, condenser lens, light reflector and light source are situated under the window 32 and in the optical path.

A suitable index plate 34 is formed on the base 12 to identify the various image positions on a microfiche in the carrier 16. If other shapes or sizes of microfiche are used, other guide plates may be substituted for plate 34. Thus, to use the reader/printer, the handle 36 is manually moved until a pointer 38 rests over a particular place on the index plate 34. Responsive to the handle 36 movement, the carrier 16 glides along the two perpendicularly oriented sets of rails. When the handle 36 comes to rest, the image resting in the optical path is the one on the microfiche in carrier 16, which is identified by pointer 38 and index 34.

From FIGS. 3-4, it is seen that the film carrier frame 18 has opposed side rails 40,42 which cooperate with the upper glass flat 20 to give a flush continuity of the upper surface of the carrier 16. The projection lens 15 and its holder 44 rests freely upon and slides over this flush upper surface.

Figure 2:
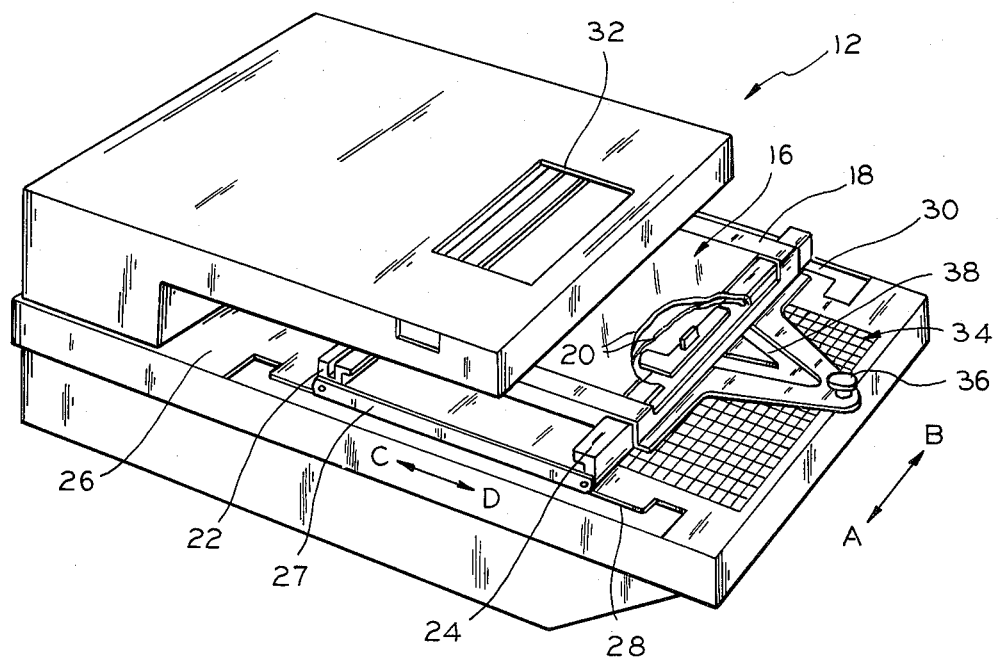
FIG. 2 is a perspective view of the base of the reader/printer of FIG. 1.

When the film carrier 16 is pulled as far as it will go in direction D (FIG. 2), the projection lens holder 44 slides over an inclined plane or extension 46 at the back of the flush upper surface (to the position seen at 48 in FIG. 5). This moves the projection lens off the upper glass flat 20 so that it may open. Also, at the extremity of carrier 16 movement in direction D, the inclined plane 46 moves under a stationary mechanical part (not shown) on the reader/printer which forces the upper glass flat 20 to pivot about hinge pin 50 and lifts it to enable a removal or insertion of a microfiche clamped between the two glass flats 20,20.

When the handle 36 and, therefore, the film carrier 16 move back in direction C, the extension 46 moves out from under the stationary part on the base and the upper glass flat 20 swings about hinge pin 50 to return under gravity to the stationary position (FIG. 6) with a microfiche clamped therebetween.

To be effective, the invention should preserve all of these usual carrier movements.

Figure 8:
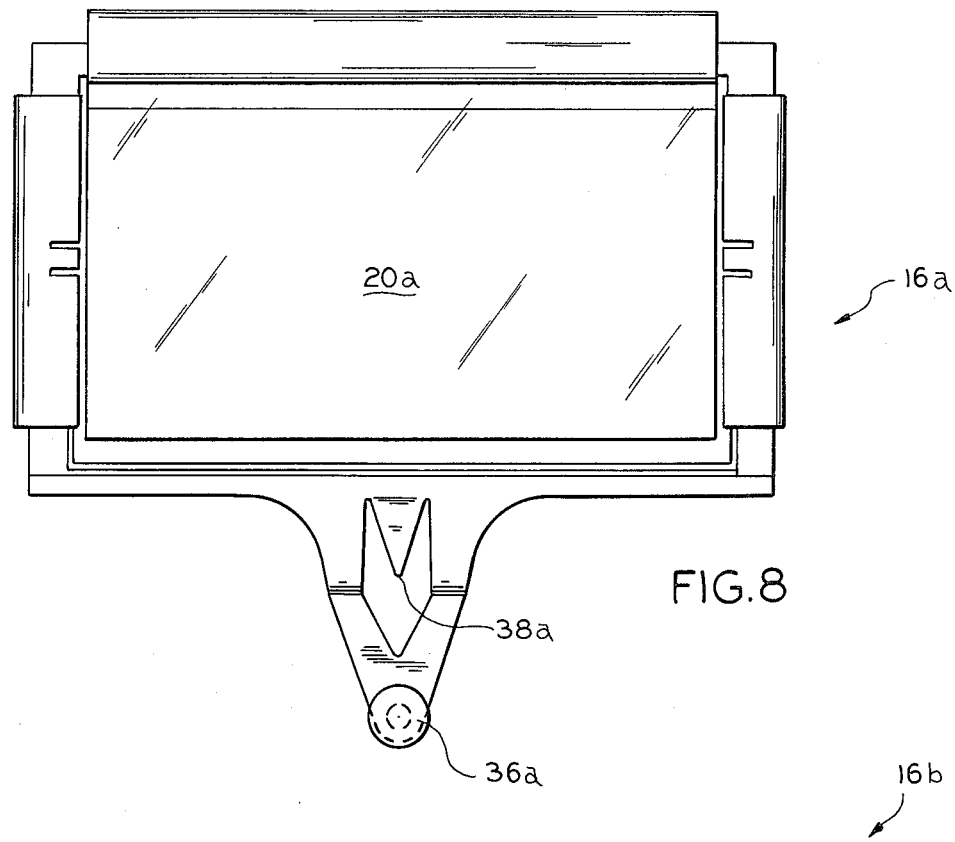
FIGS. 8 and 9 are plan views of two alternative carriers which may be used in place of the carrier of FIG. 3.
Figure 9:
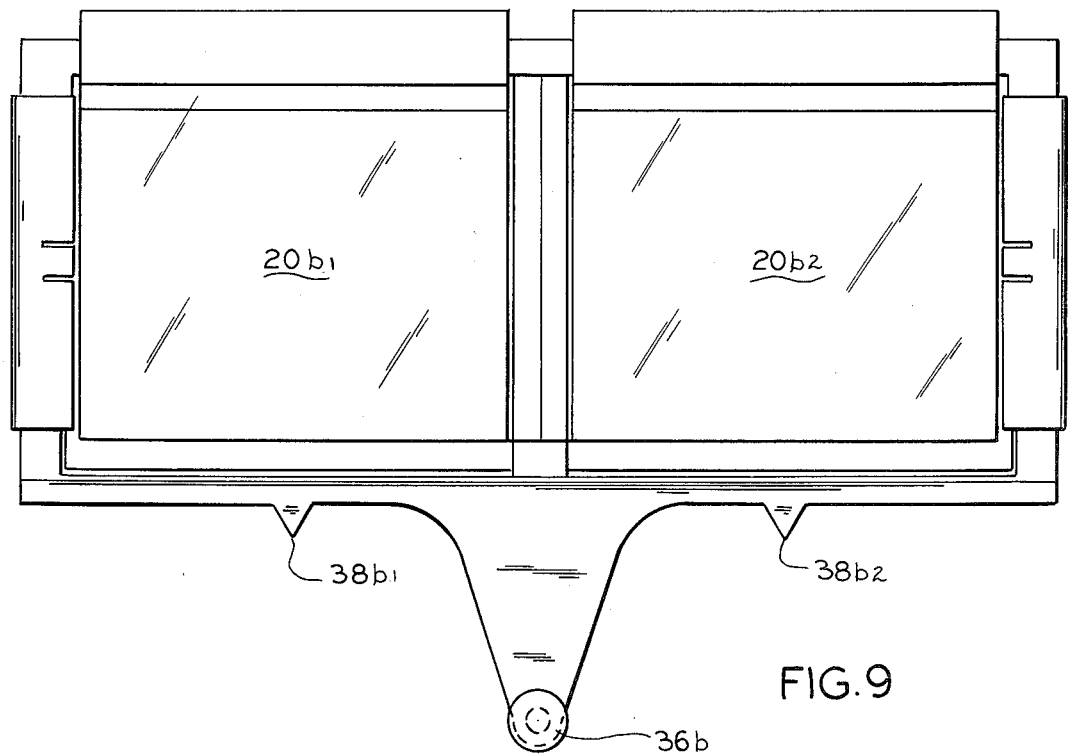

According to an aspect of the invention, an interchangeable plurality of the film carriers 16 may take any suitable one of many forms. For example, FIG. 3 shows a carrier 16 having glass flats which are approximately 6"×4"; FIG. 8 shows a carrier 16a having glass flats which are approximately 7¼"×4", and FIG. 9 shows a pair of glass flats, each being about 6"×4". Of course, carriers having other glass flat dimensions or arrangements may also be provided.

The rear edge of the frame 18 includes a generally horizontal surface 52 having a keying element 54 integrally dependent therefrom. The keying element 54 on the carrier 16 slides in a groove 56 in the guide rail 22. A foot 58 is formed on each of the opposing rear corners of the frame 18, to slide under an overhanging spline 60 on the rear guide rail 22. Thus, the rear frame keying element 54, groove 56, foot 58, and spline 60 cooperate to form a keying guideway system which enables the carrier 16 to easily slide into position when fed horizontally or laterally. However, it is not possible to lift the back of the film carrier 16 off the guide rail 22 since foot 58 is captured under spline 60.

Likewise, each of the two opposing front corners of frame 18 terminates in a foot 62 which slides horizontally under an overhanging spline 64 formed on the front guide rail 24. Therefore, the front of the film carrier also slides easily in a horizontal or lateral direction along the front guide rail 24. However, the front of film carrier 16 cannot be lifted vertically off the rail either, because foot 62 is captured under spline 64.

The front rail 24 has an associated latch mechanism 70 for establishing limits of the movement of the film carrier while enabling easy carrier movement between these established limits. This latch means is in the form of a cantilevered leaf spring 74 attached at one end 76 to the frame 18 and terminating on the other end in a thumb tab 78 for giving vertical movement to the spring. An upstanding vertical post 80 is integrally formed on the leaf spring 74 in a position which abuts against and limits the movement of the feet 62 at the front of the film carrier 16. This abutment and interference prevents these feet from moving beyond their limited positions. For example, solid lines in FIG. 4 show a foot 62 coming into abutment with the post 80. Also, from the dotted lines in FIG. 4, it is seen that, when tab 78 is pushed downwardly in the vertical direction G, the post 80 is lowered to a point where the foot 62 can pass over it.

Thus, the carrier 16 is loaded in a manner which should be apparent from an inspection of FIG. 6. The feet 58,62 on the film carrier 16 are fitted under the splines 60,64 and the keying element 54 is fitted into the groove 56. Then, the carrier is slid horizontally in direction A until the foot 62 comes into approximate abutment with the post 80. There, tab 78 is pushed downwardly in direction G so that the foot 62 may pass over post 80. The tab 78 is then released and the film carrier 16 may slide easily until the foot 62 on the opposite corner of the carriage 16 comes into abutment with the post.

To remove the film carrier 16, it is moved in direction B until the carriage 16 passes over tab 78 which is easily reached and pushed downwardly so that foot 62 may move over post 80.

The film carriers 16a and 16b (FIGS. 8,9) have the same keying system that is described above in connection with the film carrier 16 of FIG. 3. Therefore, when any of the three film carriers is removed, any other of the three film carriers may replace it.

The index plate 34 (FIG. 2) may be replaceable to accomodate the individual needs of the various carriages. Or, the index plate may be imprinted with different colors in order to provide a plurality of readings. If different colors are used on the index plate 34, the pointers 38 may have similar color coding. For example, pointer 38 (FIG. 3) may be red, to point at red numbers on index plate 34 while pointer 38a (FIG. 8) may be black to point at black numbers on index plate 34.

When it is desirable to increase the number of images which may be scanned without replacing a microfiche, the carrier 16b, with a double frame, is used. Here, each microfiche in the double frame has its own individually associated pointer 38b1,38b2 to index the positions of the images on the associated microfiche. If the handle 36b is positioned so that either one of the two sets of glass flats 20b1,20b2 is in the optical path and under the projection lens, the associated pointer 38b1,38b2 is over the index plate 34 in an image-identifying position.

The invention also contemplates film carriers with double frames where one of the glass flats 20b1, 20b2 is larger than the other. If so, and assuming that the structure is as described above, one of the pointers 38b,38b2 could be red and the other could be black, in order to correlate the index plate with the size of the microfiche in the corresponding side of the film carrier.

Also, the upper surfaces of the two glass flats 20b1, 20b2 should be substantially flush with each other and nearly unbroken in order to present a single plane so that the projection lens glides smoothly across them, as the carrier 16b glides back and forth between the positions for reading two microfiche.

Those who are skilled in the art will readily perceive how to modify the described structure without departing from the scope and spirit of the invention. For example, an alternative releasable hold-down means is seen in FIG. 7. Instead of the keying guideway system formed by the foot 58 and spline 60 combination, the embodiment of FIG. 7 provides an inverted, generally T-shaped keying element 84 on the back of the film carrier 16. The crossbar of the "T" is captured in a correspondingly shaped groove in the back rail 22. This way, the carrier may slide horizontally into the rail but cannot be lifted vertically out of the rail. Accordingly, the appended claims are to be construed to cover all equivalent structures which fall within the true scope and spirit of the invention.

I claim:

1. A Microfilm reader/printer comprising a film carrier means mounted on two orthogonally oriented pairs of spaced, parallel rails whereby said carrier means may glide over said rails to any position defined by the rails, keying guideways means formed by said film carrier in association with said rails for releasably enabling said film carrier to be secured onto said rails whereby a plurality of said film carriers may be used interchangeably, means for indicating the position of any said interchangeable film carriers relative to an optical path through said reader and means for securing saidrails to said reader/printer whereby neither of said pairs of rails is removed from said reader/printer when changing film carriers.

2. The reader/printer of claim 1 wherein said keying guideway means comprises a spring catch means for stopping movement of said film carrier at either of two opposed limits while enabling free movement of said film carrier between said opposed limits.

3. The reader/printer of claim 2 wherein said spring catch means comprises an elongated cantilevered spring attached at one end to a supporting structure for said film carrier and free for vertical movement at the other end, and upstanding post means integrally formed on said cantilevered spring means, said upstanding post abutting against and interfering with movement of said film carrier at said opposed limits when the cantilever spring is in a normal position and moving to a non-interfering position when said cantilever spring is moved to an off-normal position in order to enable an interchanging of said carriers.

4. The reader/printer of claim 3 wherein said one end of the cantilevered spring is positioned on said supporting structure at a point under said film carrier means and said other end of said cantilever spring projects beyond said film carrier when moved to one of said opposed limits of carrier movement, whereby, if said carrier means is moved to said one limit, said one end of said cantilever spring may be activated and moved to said off-normal position.

5. The reader/printer of claim 1, 2, 3, or 4 wherein said releasable enabling means further comprises a rear one of said rails for supporting said carrier means having a keying element with a spline and a foot on said carrier for horizontally and slidably capturing the spline.

6. The reader/printer of claim 1, 2, 3 or 4 wherein said releasable enabling means further comprises an inverted generally T-shaped keying element horizontally and slidably captured in a correspondingly-shaped groove in a rear one of said rails for supporting said carrier means.

7. The reader/printer of claim 1, 2, 3 or 4 wherein at least one of said film carrier means comprises a double frame having two side-by-side pairs of glass flats for receiving and supporting two separate microfiche.

8. A microfiche reader/printer comprising a film carrier and support means having a lateral keying guideway system which enables easy film carrier sliding motion in a horizontal direction with said carrier being captured in a vertical direction, said film carrier mounted on one pair of spaced parallel guide rails whereby said carrier may glide over said rails to any position defined by said rails, and said film carrier having thereon a second pair of guide rails whereby said carrier may glide over said second pair of rails to any position defined by said second pair of rails, latch means for limiting said horizontal sliding motion along said second pair of guide rails, and means for releasing said latch means so that said film carrier may move beyond said limit and out of said keying guideway system whereby a plurality of carriers may be used interchangeable without removing either of said pairs of guide rails from said reader/printer.

* * * * *